(12) United States Patent
Mishra et al.

(10) Patent No.: US 9,880,895 B2
(45) Date of Patent: Jan. 30, 2018

(54) SERIAL INTERFACE WITH BIT-LEVEL ACKNOWLEDGEMENT AND ERROR CORRECTION

(71) Applicant: QUALCOMM Incorporated, San Diego, CA (US)

(72) Inventors: Lalan Jee Mishra, San Diego, CA (US); Richard Wietfeldt, San Diego, CA (US); George Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 15/182,328

(22) Filed: Jun. 14, 2016

(65) Prior Publication Data

US 2016/0371157 A1    Dec. 22, 2016

Related U.S. Application Data

(60) Provisional application No. 62/182,270, filed on Jun. 19, 2015.

(51) Int. Cl.
| | |
|---|---|
| *G06F 11/07* | (2006.01) |
| *G06F 13/42* | (2006.01) |
| *G06F 1/32* | (2006.01) |
| *G06F 11/16* | (2006.01) |

(52) U.S. Cl.
CPC ........ *G06F 11/0766* (2013.01); *G06F 1/3296* (2013.01); *G06F 11/162* (2013.01); *G06F 11/1604* (2013.01); *G06F 13/4282* (2013.01)

(58) Field of Classification Search
CPC ............. G06F 11/0766; G06F 11/1604; G06F 13/4282; G06F 13/4286; G06F 13/4273; H03M 5/02
See application file for complete search history.

(56) References Cited

U.S. PATENT DOCUMENTS

| | | |
|---|---|---|
| 5,159,684 A | 10/1992 | Kroll et al. |
| 5,455,911 A | 10/1995 | Johansson |
| 5,619,544 A | 4/1997 | Lewis et al. |
| 2013/0120032 A1 | 5/2013 | Quiquempoix |
| 2013/0322461 A1 | 12/2013 | Poulsen |
| 2015/0263823 A1 | 9/2015 | Sengoku |
| 2016/0034416 A1* | 2/2016 | Chavez ............... G06F 13/4282 381/59 |

FOREIGN PATENT DOCUMENTS

WO    WO-2016040884 A1    3/2016

OTHER PUBLICATIONS

Koschel et al., Multi Gigabit communication with hybrid pulse shaping & fractional oversampling, 2012, IEEE, pp. 2466-2471.*
International Search Report and Written Opinion—PCT/US2016/037672—ISA/EPO—Sep. 16, 2016.

* cited by examiner

*Primary Examiner* — Shelly A Chase
(74) *Attorney, Agent, or Firm* — Haynes and Boone LLP (57) ABSTRACT

A bit-by-bit error correction technique is disclosed that divides each bit transmission into an acknowledgment phase, an error correction phase, and a transmission phase.

26 Claims, 7 Drawing Sheets

SERIAL INTERFACE WITH BIT-LEVEL ACKNOWLEDGEMENT AND ERROR CORRECTION

CROSS-REFERENCE TO RELATED APPLICATIONS

This application claims the benefit of U.S. Provisional Application No. 62/182,270, filed Jun. 19, 2015.

TECHNICAL FIELD

This application relates to integrated circuit interfaces, and more particularly to a serial interface with bit-level acknowledgement and error correction.

BACKGROUND

General purpose input/output (GPIO) enables an integrated circuit designer to provide generic pins that may be customized for particular applications. For example, a GPIO pin is programmable to be either an output or an input pin depending upon a user's needs. A GPIO module or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIO terminals (one GPIO terminal to transmit a given signal and one GPIO terminal to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIO pins for IPC limits the GPIO availability for other system-level peripheral interfaces. The problem cannot be solved by moving the 1PC communication onto the main data bus between the processors in that certain corner conditions may then be violated.

To alleviate the pin demands suffered by conventional GPIO systems, a "virtual" GPIO architecture has been developed in which multiple GPIO signals are serialized onto a single transmit pin such as through a finite state machine (FSM). The FSM receives the multiple GPIO signals from a hybrid GPIO interface that in turn receives the multiple GPIO signals from a processor. The GPIO interface is deemed to be a "hybrid" GPIO because it also interfaces with conventional GPIO pins that transmit conventional GPIO signals. The distinction between the conventional GPIO signals and the virtual GPIO signals carried on the dedicated transmit pin is transparent to the processor. This is quite advantageous in that the processor needs no software modification to communicate through the hybrid GPIO interface. With regard to transmission, the processor thus presents a set of GPIO signals to the hybrid GPIO interface. Depending upon the number of conventional GPIO pins available, the hybrid GPIO interface will present a first subset of the GPIO signals to the conventional GPIO pins for conventional GPIO transmission. In contrast, the hybrid GPIO interface presents a remaining subset of the GPIO signals to the FSM, which serializes them and transmits them over the dedicated transmit pin.

The dedicated transmit pin couples through a suitable transmission line such as a circuit board trace to a receiving integrated circuit's dedicated receive pin. The transmitting integrated circuit discussed above thus also includes a dedicated receive pin for receiving transmitted virtual GPIO signals from a remote integrated circuit. The FSM deserializes the received virtual GPIO signals into a first set of received GPIO signals. Similarly, the FSM receives a second set of received GPIO signals through the conventional GPIO pins. The first and second set of received GPIO signals may then be presented to the processor in a conventional fashion. To the processor, it is thus transparent whether a given received GPIO signal was received on the dedicated receive pin as a virtual GPIO signal or over the conventional GPIO signals. The processor thus needs no software modification with regard to transmission or reception.

The virtual GPIO signals are transmitted in frames. In one embodiment, each frame may include one or more bits from each virtual GPIO signal such that the frame length depends upon the number of virtual GPIO signals. As the number of virtual GPIO signals increases, so would the frame length in such embodiments. This increased frame length increases latency with regard to the time needed to transmit each frame. Should a frame need to be retransmitted due to errors, the resulting latency may exceed system requirements.

Accordingly, there is a need in the art for improved error correction techniques for serial interfaces.

SUMMARY

To provide improved latency for frame-based serial communication protocols, an impedance-based error correction technique is provided that modifies both the impedance of a transmit terminal for a transmitting integrated circuit and the impedance of a receive terminal for a receiving integrated circuit. Each bit period (bit unit interval) for a binary signal transmitted over the transmit terminal to the receive terminal is divided into an error correction phase, a transmission phase, and an acknowledgement phase. The transmitting integrated circuit includes a transmitting serial interface for driving the transmit terminal during the transmission phase to drive a binary output signal over a transmission line such as an integrated circuit trace to the receive terminal for a receiving serial interface on the receiving integrated circuit. The signaling is binary such that a first binary value (e.g., a binary zero) is transmitted by the transmitting serial interface grounding its transmit terminal for the duration of the current bit interval. Similarly, the transmitting interface transmits a binary one bit by charging its transmit pin to a positive voltage such as a power supply voltage for the duration of the current bit period. It will be appreciated that a negative logic convention may also be used in which the binary values are reversed for the binary one and zero transmissions.

Although each bit for the binary output signal is transmitted from the transmit terminal to the receive terminal, note that both these terminals are bi-directional in that the receiving serial interface acknowledges what it has interpreted as the transmitted binary signal during each acknowledgment phase. In particular, the receiving serial interface drives its receive pin to either the positive signaling voltage or to ground for a portion of the acknowledgement phase depending upon what binary value the receiving integrated circuit has interpreted during the transmission phase. If the acknowledgment phase shows that the receiving serial interface has incorrectly received a current bit transmitted during the preceding transmission phase, the transmitting serial interface corrects this error in the error correction phase for the subsequent bit.

Each bit period is thus divided into an initial error correction phase followed by the transmission phase and ending in the acknowledgment phase. To coordinate these phases, each serial interface includes its own oversampling clock that cycles at some predetermined oversampling rate for each bit period. The resulting impedance-based acknowledgement and error correction for each transmitted bit is quite advantageous in that latency is reduced as compared to performing the acknowledgment and error correction on a per-frame basis as opposed to the per-bit basis disclosed herein.

Due to the bi-directionality of the receive and transmit terminals, the output impedance for each terminal is thus also an input impedance. The following discussion will thus just refer to an "impedance" for each serial interface's terminal in that each terminal will both transmit and receive. During an initial portion of the transmission phase, the transmitting serial interface drives its transmit terminal (to the positive signaling voltage or ground depending upon the binary value to be transmitted) using a relatively low impedance on its transmit pin. During a final portion of the transmission phase, the transmitting serial interface drives its transmit terminal using a relatively high impedance that is greater than relatively low impedance. The duration of the initial and final portions of the transmission phase are determined according to samples of the transmitting serial interface's oversampling clock. During the transmission phase, the receiving serial interface selects for a relatively high impedance that is substantially equal to the high impedance for the transmitting serial interface. In this fashion, the transmitting serial interface may readily charge the receiving serial interface's receive terminal either high or low responsive to the desired binary value being transmitted during each transmission phase.

During the acknowledgement phase, the receiving serial interface drives its receive terminal with the voltage (the positive signaling voltage or ground) corresponding to what it has decoded as the transmitted bit during the preceding transmission phase. This drive occurs according to a low impedance on the receive terminal so that the receiving serial interface may quickly charge or discharge the corresponding transmission channel coupled from its receive terminal to the transmit terminal on the transmitting device. At the end of the acknowledgement phase, the receiving serial interface changes the impedance of the receive terminal back to the high impedance value. The transmitting serial interface then responds to the acknowledgement phase in an error correction phase for the subsequent bit transmission that is demarcated from the preceding acknowledgement phase by the transmitting serial interface changing the binary state of the transmission channel. If the receiving serial interface had driven its receive pin to the positive signaling voltage during the acknowledgment phase, the transmitting serial interface would thus discharge its transmit terminal at the onset of the error correction phase. Conversely, if the receiving serial interface had discharged the voltage on its receive terminal during the acknowledgement phase, the transmitting serial interface would charge its transmit terminal to the positive signaling voltage at the onset of the error correction phase.

Should the receiving serial interface have acknowledged the correct binary value during the acknowledgement phase (the receiving serial interface acknowledging the same binary value as transmitted during the transmission phase by the transmitting serial interface), the transmitting serial interface may leave the transmit terminal voltage unaltered during the remainder of the error correction period, which signals to the receiving serial interface that it has correctly decoded the transmitted bit. Should the receiving serial interface have incorrectly acknowledged the transmitted bit, the transmitting serial interface pulses its transmit terminal voltage during the error correction phase so that the receiving serial interface may detect at least three rising or falling edges in its receive terminal voltage during the error correction phase. If the error correction phase initiated with the transmit pin voltage discharged, the pulsing is positive to the power supply voltage. Conversely, if the error correction phase initiated with the transmit pin voltage charged to the power supply voltage, the pulsing is negative to ground. The receiving serial interface monitors the voltage of its receive terminal during the error correction phase to determine the number of rising or falling edges it detects within the error correction phase. Should the receiving serial interface detect two or fewer edges, it is assured that it has decoded the transmitted bit correctly. Conversely, if the receiving serial interface detects three or more rising or falling edges in its receive terminal voltage during the error correction phase, it decodes the transmitted bit in the previous transmission phase as the complement of what it had acknowledged during the corresponding acknowledgement phase.

Advantageously, no intermediate stop bits are thus necessary. In contrast, a conventional asynchronous serial interface requires intermediate stop bits should relatively lengthy frames be implemented. Moreover, bits transmitted in error may be immediately corrected without requiring re-transmission of the corresponding frame. Thus, the latency issues associated with serial transmission of frames over a two-wire interface are solved.

Embodiments of the present disclosure and their advantages are best understood by referring to the detailed description that follows. It should be appreciated that like

DETAILED DESCRIPTION

A serial interface is disclosed that provides a bit-level error correction so that an entire frame of bits need not be repeated due to the bit-level error correction. This serial interface will be described in the context of a virtual GPIO interface but it will be appreciated that alternative embodiments may be implemented in which the bit-level error correction is practiced without virtual GPIO interface capability. The following discussion will be directed to a virtual GPIO embodiment that uses a modified UART interface. However, it will be appreciated that any two-terminal serial interface may be modified to advantageously include the bit-level error correction discussed herein. Thus, the following discussion will be directed to a virtual GPIO/modified UART embodiment without loss of generality.

Figure 1:
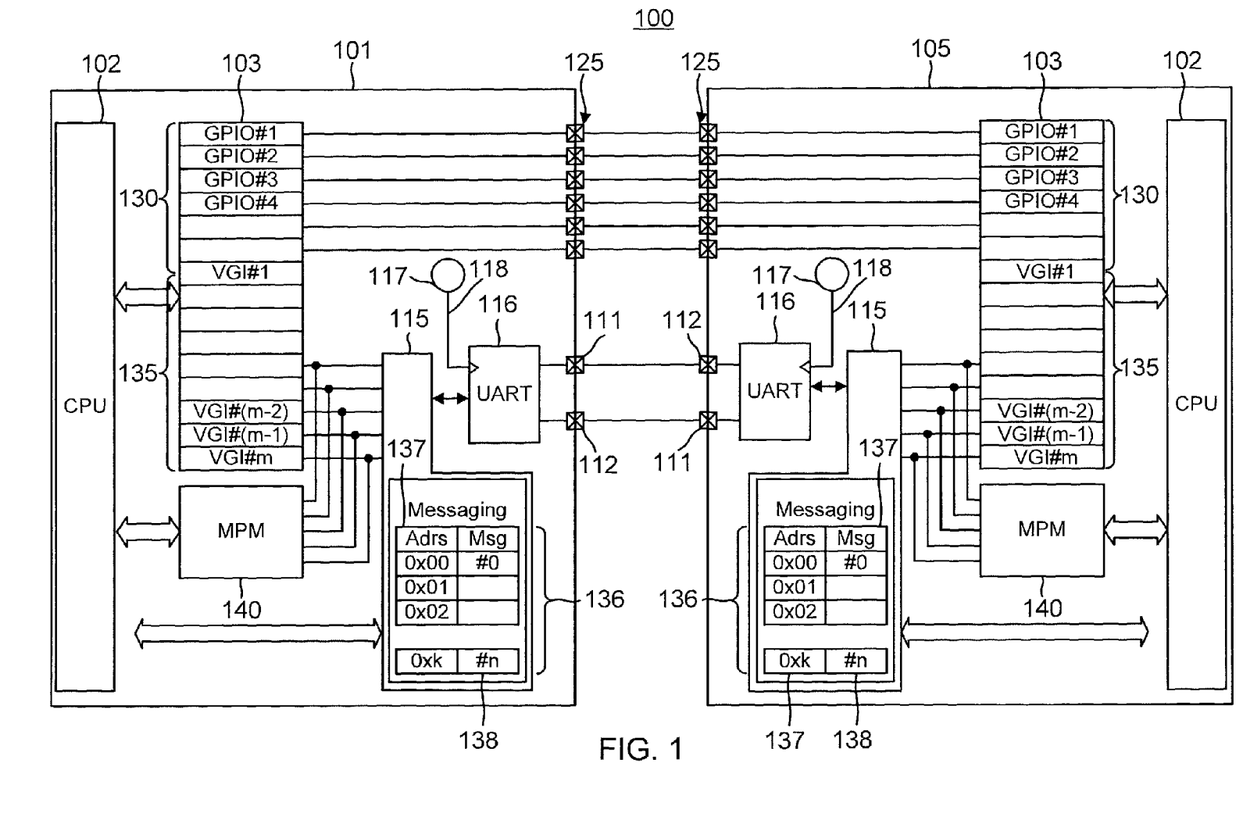
FIG. 1 is block diagram of an example hybrid virtual GPIO architecture.

An example hybrid virtual general purpose input/output (GPIO) architecture 100 is shown in FIG. 1. A host integrated circuit 101 and a peripheral integrated circuit 105 both include a two-terminal serial interface including a transmit (TX) terminal 111 and a receive (RX) terminal 112. The TX terminal 111 for the host integrated circuit 101 couples through a transmission line such as a circuit board trace to the RX terminal 112 for peripheral integrated circuit 105. Similarly, the TX terminal 111 for peripheral integrated circuit 105 couples through another transmission line such as a circuit board trace to the RX pin 112 for host integrated circuit 101.

Host integrated circuit 101 includes a processor (CPU) 102. Similarly, peripheral integrated circuit 105 includes a processor 102. Each processor 102 couples to a corresponding GPIO interface 103 so it may interface with a set of standard GPIO pins 125 in a conventional fashion. A certain portion of the signals processed through each GPIO interface 103 from the corresponding processor 102 may thus be transmitted and received on conventional GPIO pins 125 as conventional GPIO signals 130. But a remaining portion of the signals processed through GPIO interface 103 are not transmitted or received through conventional GPIO pins 125. Instead, a remaining portion of signals 135 are transmitted and received through a corresponding GPIO finite state machine (FSM) 115 using the integrated circuit's dedicated transmit terminal 111 and its dedicated receive terminal 112. Each FSM 115 also interfaces directly with the corresponding processor 102 with regard to receiving and transmitting messaging signals such as UART signals 136. Since UART signals 136 are not GPIO signals, they do not couple through GPIO interfaces 103 as will be explained further herein. Each FSM 115 transmits and receives UART signals 136 through its dedicated transmit terminal 111 and receive terminal 112. These terminals are thus "hybrid" terminals in that they are used for both virtual GPIO signals 135 and UART signals 136.

UART signals 136 are one form of messaging signals. As used herein, "messaging signals" refer to signals that would conventionally be transmitted over a dedicated transmit pin such as practiced in the IPC or serial peripheral interface (SPI) protocols. Messaging signals thus include an address so that the receiving processor may route the received messaging signal to the appropriate register. A hybrid virtual GPIO architecture is deemed as "virtual" in that, to the system-level applications creating virtual GPIO signals 135, it is as if those virtual GPIO signals 135 were being accommodated for input/output on conventional GPIO pins.

In other words, a system on chip (SOC) or processor 102 having the virtual GPIO architecture disclosed herein experiences no functional difference between conventional GPIO signals 130 and virtual GPIO signals 135. However, only two terminals are used to transmit and receive virtual GPIO signals 135 that would otherwise each need their own dedicated pair of GPIO pins (if the GPIO signaling is symmetric).

Virtual GPIO signals 135 do not each have their own dedicated pins as is the case for conventional GPIO signals 130. This is quite advantageous in that hybrid virtual GPIO architecture 100 achieves a significant reduction of pins as compared to a conventional GPIO embodiment in which virtual GPIO signals 135 would each require their own pin. UART signals 136 would conventionally require another dedicated transmit pin and another dedicated receive pin as well. But these additional pins are also eliminated in the advantageous hybrid virtual GPIO architecture of the present matter.

Figure 2A:
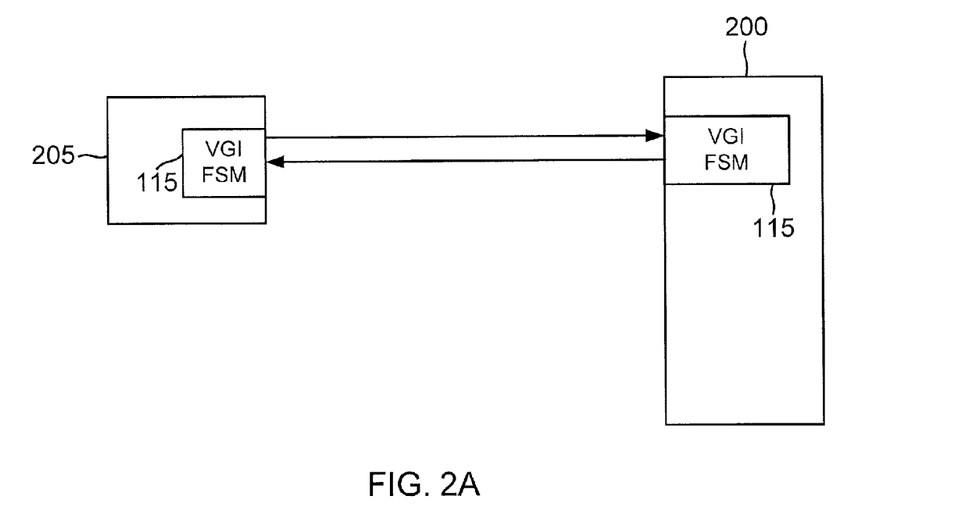
FIG. 2A is a high-level block diagram for a hybrid virtual GPIO architecture in which a processor communicates with a single remote processor.
Figure 2B:
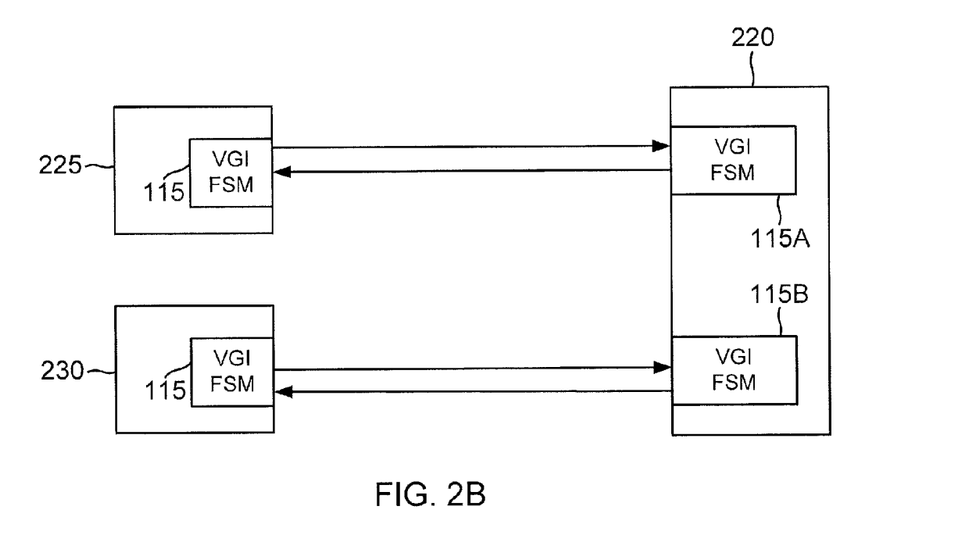
FIG. 2B is a high-level diagram for a hybrid virtual GPIO architecture in which a processor communicates with two remote processors.

An integrated circuit may include just one FSM 115 or may include a plurality of these elements for interfacing with multiple external systems. FIG. 2A illustrates a hybrid virtual GPIO architecture in which an integrated circuit 200 includes a single FSM 115 for communicating with a remote processor in an integrated circuit 205, which includes its own FSM 115. In contrast, an integrated circuit 220 shown in FIG. 2B includes an FSM 115A and an FSM 115B for communicating with remote processors through corresponding FSMs 115 in integrated circuits 225 and 230, respectively. In that regard, an integrated circuit as discussed herein may be configured with as many FSMs as is necessary to accommodate hybrid virtual GPIO signaling with other SOCs.

Referring again to FIG. 1, because virtual GPIO signals 135 are accommodated using a finite state machine such as FSM 115, processors 102 may be asleep or in another type of dormant state yet be able to receive virtual GPIO signals 135 and messaging signals 136. In this fashion, virtual GPIO architecture 100 not only advantageously economizes the number of terminals for each GPIO interface 103 but is also low power.

As used herein, "terminal" or "pin" are equivalent generic terms to cover the structure such as a pad or a pin that an integrated circuit uses to couple to leads on circuit board or other physical interconnects (e.g., package interconnect or through-hole via interconnect). For example, if each integrated circuit has sixteen GPIO pins or pads 125, then these pins could be configured to accommodate eight symmetric GPIO signals 130 (for illustration clarity, only four conventional GPIO signals #1 through #4 are shown in FIG. 1) or sixteen asymmetric GPIO signals 130. In addition, each integrated circuit can accommodate the input/output interfacing of a plurality of m virtual GPIO signals 135, wherein m is an arbitrary positive plural integer. Similarly, each integrated circuit can accommodate the input/output interfacing of a plurality of n UART signals 136, n being a positive plural integer. With regard to each processor 102, there is no difference between GPIO signals 130 and virtual GPIO signals 135: they are both treated as GPIO signals that are transmitted and received as necessary through GPIO interface 103. However, since virtual GPIO signals 135 and messaging signals 136 do not have dedicated pins in contrast to conventional GPIO signals 130, virtual GPIO signals 135 and messaging signals 136 are serialized in FSMs 115 for transmission on the corresponding TX terminal 111. Upon reception on RX terminal 112, each FSM 115 deserializes the received serialized virtual GPIO signals and the received serialized UART signals. Thus, each FSM 115 functions as a serializer/deserializer with regard to virtual GPIO signals 135 and UART signals 136.

Each processor 102 may need to receive an interrupt signal in response to changes in selected ones of the virtual GPIO signals 135 or the messaging signals 136. With respect to virtual GPIO signals 135, a modem power manager (MPM) 140 monitors the selected GPIO signals as programmed through interrupt configuration registers (not illustrated). Each virtual GPIO signal 135 has a corresponding interrupt configuration register. Should a virtual GPIO signal 135 be required to generate an interrupt in response to that signal changing state, the corresponding configuration register would be programmed accordingly. Similarly, should a virtual GPIO signal 135 be one that does not generate an interrupt regardless of whether that signal has changed state, the corresponding interrupt configuration register would also be programmed accordingly. MPM 140 may also comprise a finite state machine. Thus, just like FSM 115, MPM 140 is low power and is active regardless of whether its processor is in a sleep mode or some other dormant state.

Virtual GPIO signals 135 may be subdivided into a transmit set and a receive set. In a symmetric system, each transmit set would have the same number of signals. Similarly, each receive set would have the same number of signals. However, it will be appreciated that virtual GPIO architecture 100 is advantageous in that it can readily accommodate an asymmetric signaling embodiment in which the transmit sets of virtual GPIO signals 135 and UART signals 136 have different sizes and in which the receive sets of GPIO signals 135 and UART signals 136 also have different sizes. Regardless of whether architecture 100 is symmetric or asymmetric, each FSM 115 receives the transmit set of virtual GPIO signals 135 in parallel from GPIO interface 103 in the sense that each signal in these transmit sets is carried on its own lead between GPIO interface 103 and FSM 115. The UART signals 136 are not GPIO signals and thus do not couple through GPIO interface 103. In that regard, the hybrid interface as represented by each FSM 115 may be given some peripheral address by the corresponding processor 102. Each FSM 115 is configured to decode an address field 137 in UART signals 136 so that a given UART signal 136 may be stored in a corresponding messaging register 138. These messaging registers 138 are each mapped to some offset of the general address for FSM 115 within the address space for the corresponding processor 102. Each processor 102 can then access the corresponding messaging registers 138 to obtain the appropriate UART signals 136. Just like virtual GPIO signals 135, UART signals 136 may be subdivided into a transmission set and a receive set. Regardless of whether the architecture is symmetric or asymmetric, the resulting transmission of these transmit sets by FSM 115 takes place over a single transmit pin. The transmit set of virtual GPIO signals 135 from one processor becomes the receive set of virtual GPIO signals 135 for the remote processor. Similarly, the transmit set of UART signals 136 becomes the receive set of UART signals 136 for the remote processor. The remote processor's FSM 115 then deserializes the receive set of virtual GPIO signals 135 so that they may be presented in parallel to GPIO interface 103.

Each FSM 115 couples to its TX 111 terminal and RX terminal 112 through a corresponding modified UART interface 116. The FSM 115 and modified UART interface 116 in each integrated circuit form a transmitting serial interface and a receiving serial interface depending upon whether data is being transmitted or received by a given integrated circuit.

Figure 3:
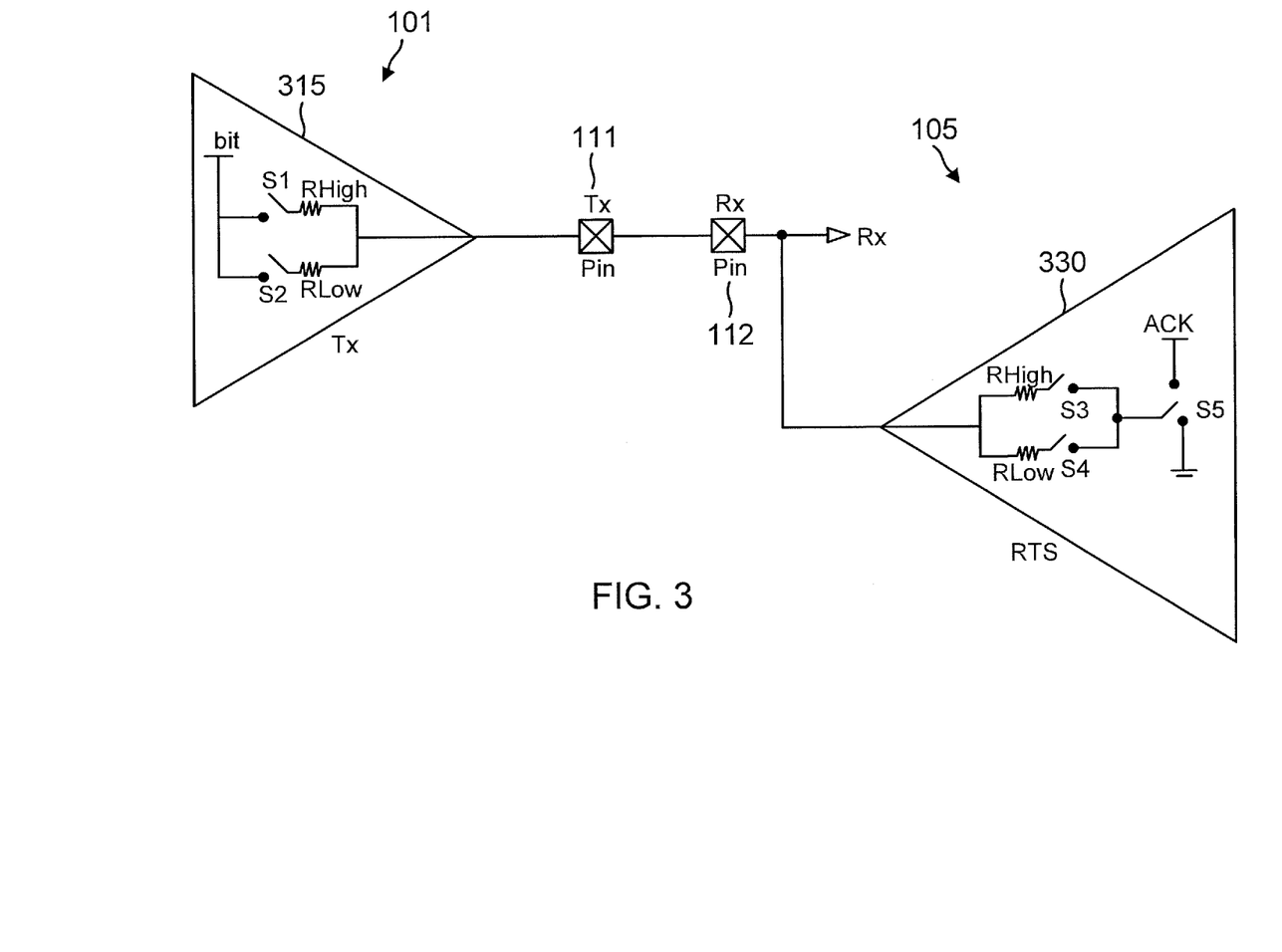
FIG. 3 illustrates the impedance control circuitry for the serial interfaces in the system of FIG. 1.

Each modified UART interface 116 transmits and receives according to a oversampling clock signal 118 from a corresponding oversampling clock source 117. The modification of modified UART interface 116 as compared to a conventional UART interface includes the impedance selection circuitry shown in FIG. 3. For illustration clarity, only a single transmit pin 111 and a corresponding receive pin 112 are shown in FIG. 3. The modified UART interface 116 (FIG. 1) that drives transmit pin 111 of FIG. 3 includes a transmitter output driver 315. Similarly, the modified UART interface 116 that receives through receive pin 112 of FIG. 3 includes a receiver output driver 330.

Transmitter output driver 315 drives its bit signal (either the positive signaling voltage or ground depending upon its binary value) either through a switch S1 or through a switch S2. Switch S1 couples the output bit signal to transmit pin 111 through a resistor RHigh. Similarly, switch S2 couples the output bit signal to transmit pin 111 through a resistor RLow. The resistance of resistor RHigh is relatively high such as 10K ohms whereas the resistance of resistor RLow is much lower such as 50 ohms. In this fashion, each modified UART interface 116 can drive its transmit terminal 111 through either a high impedance or a low impedance.

Receiver output driver 330 in the receiving modified UART interface 116 (FIG. 1) couples its receive pin 112 to an analogous resistor RHigh through a switch S3 or to a resistor RLow through a switch S4 to either an acknowledgement (ACK) signal or to ground through a switch S5. During the transmission phase and during the error correction phase of each transmitted bit, switch S5 selects for ground. During the acknowledgement phase, switch S5 selects for the acknowledgment signal. The operation of switches S1 through S5 may be better understood with regard to the two consecutive bit transmissions shown in FIG. 4A.

Figure 4A:
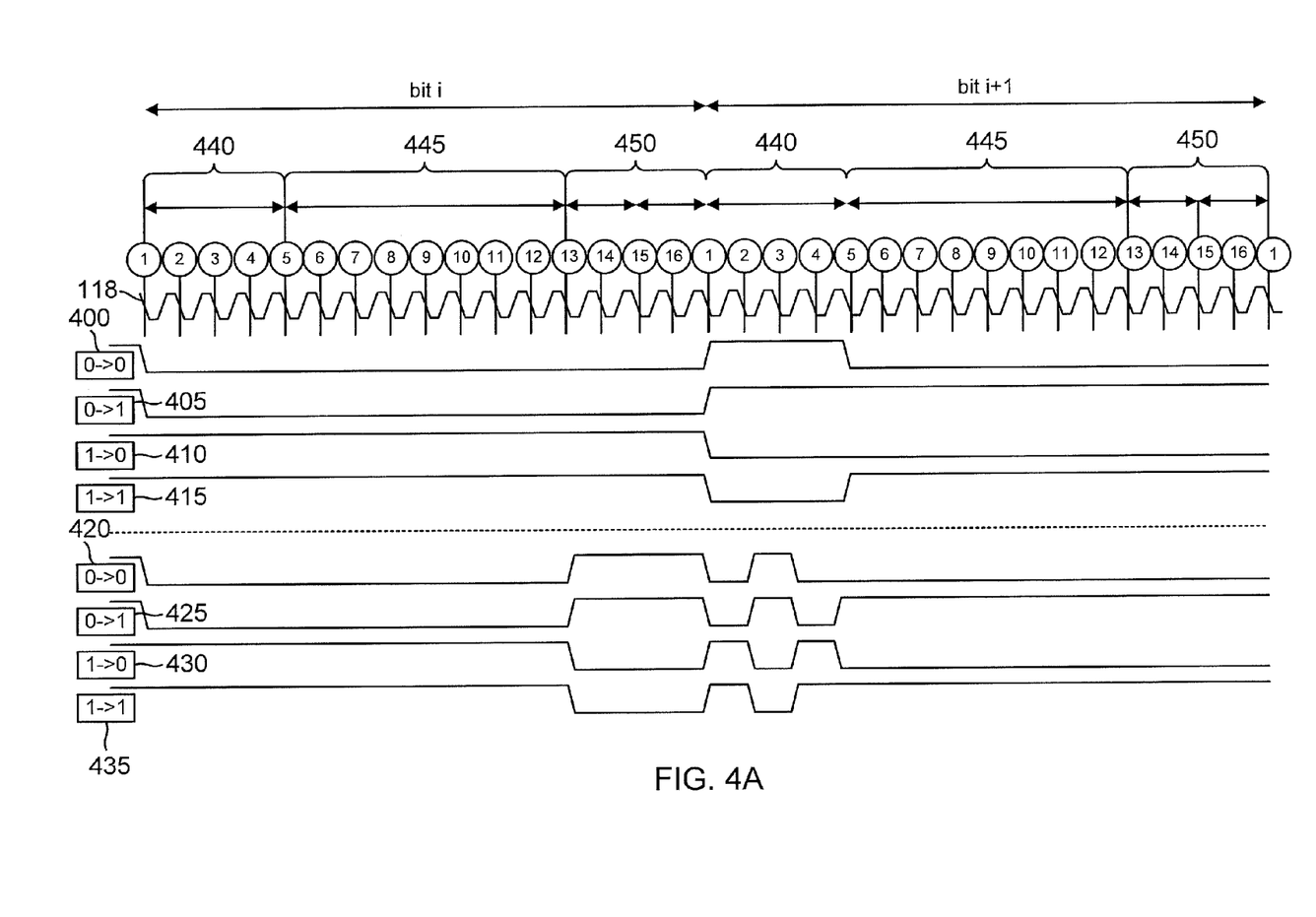
FIG. 4A is diagram of consecutive bits transmitted according to various scenarios for a bit-level error correction scheme in accordance with an aspect of the disclosure.

A current bit transmission in FIG. 4A is denoted as bit i followed by a consecutive bit (i+1). The total number of possible binary sequences for two such consecutive bits is four. With regard to these four possible combinations, there are two possibilities: the receiving serial interface has correctly decoded the current bit i or it has not. For a set of bit sequences 400, 405, 410, and 415, the receiving serial interface has correctly decoded the current bit i. But for a set of bit sequences 420, 425, 430, and 435, the receiving serial interface has incorrectly decoded the current bit i. In bit sequences 400 and 420, both the current bit i and the consecutive bit (i+1) are binary zeroes. In bit sequences 405 and 425, the current bit i is a binary zero and the consecutive bit (i+1) is a binary one. In bit sequences 410 and 430, the current bit is a binary one and the consecutive bit (i+1) is a binary zero. Finally, in bit sequences 415 and 435, both the current bit i and the consecutive bit 1 are binary ones.

To solve the latency issues of retransmitting relatively lengthy frames due to bit errors, each bit includes three durations or periods, which are designated herein as phases: for example current bit i and consecutive bit (i+1) each includes an error correction phase 440, a transmission phase 445, and an acknowledgement phase 450.

The following discussion will assume that a 16× oversampling clock signal 118 is used in each of the transmitting and receiving devices as discussed previously. But it will be appreciated that other oversampling clock rates may be used. Depending upon the oversampling clock rate, each phase corresponds to a certain number of samples of oversampling clock signal 118. In one embodiment, error correction phase 440 comprises the first four samples in the corresponding bit period. Similarly, transmission phase 445 extends from the fifth through the eleventh sample for each bit period (eight samples total) such that four final samples for each bit period are left for the acknowledgement phase 1150. It will be appreciated that the different numbers of samples may be used to form the various phases in alternative embodiments.

To control the transitions into the various phases, the transmitting and receiving serial interfaces each includes an oversampling counter (not illustrated) to count the 16 samples per bit period. The receiving serial interface thus may be configured to reset its oversampling counter when the receiving serial interface detects the corresponding rising or falling edge that initiates error correction phase 440. After the four samples for error correction phase 440, the transmitting serial interface transmits the corresponding bit in transmission phase 445. A logic one bit may be transmitted by charging the transmit pin to the power supply voltage during the duration of transmission phase 445. Similarly, a logic zero bit may be transmitted by keeping the transmit pin grounded for the duration of transmission phase 445. Complementary transmission states may be used in alternative embodiments.

During each transmission phase 445, the receiving serial interface decodes the received bit based upon the corresponding samples it takes of its receive pin voltage. Should the receiving serial interface decode the transmitted bit as a logic one, it then drives its receive pin voltage high to the power supply voltage during the corresponding acknowledgment phase 450. Conversely, a decoded logic zero may be acknowledged during each acknowledgment phase 450 by the receiving device discharging its receive pin voltage to ground. For the no error bit combinations, 400 through 415, the receiving serial interface has correctly decoded the transmitted bit. But a decoding error exists for each bit combination 420 through 435. To signal this error, the transmitting serial interface pulses or toggles the voltage on its transmit pin so that an extra rising and falling edge is transmitted to the receiving device in the corresponding error correction phase 440.

For example, in bit combination 420, the receiving serial interface has incorrectly driven its receive pin voltage high in the acknowledgment phase 450 for current bit i. The transmitting serial interface commands the receiving serial interface to correct this error by pulsing its transmit terminal voltage during the error correction phase 440 in consecutive bit (i+1). Since each error correction phase 440 is initiated by the transmitting serial interface changing the binary state of its transmit pin voltage, the transmitting serial interface discharges its transmit pin voltage to begin the error correction phase 440 for the (i+1)th bit in bit combination 420. For the second and third samples in this error correction phase 440, the transmitting serial interface then pulses its transmit pin high to the power supply voltage before again discharging it for the final fourth sample. The receiving serial interface will thus detect three edges (in this case, two falling and one rising) during this error correction phase 440. The receiving serial interface is thus configured to determine the number of rising and falling edges it detects during each error correction phase 440. If it detects three or more edges, the receiving serial interface thus reverses the binary state of the previously decoded bit. In this fashion, error correction is achieved at the bit level without requiring retransmission of each frame. For bit combinations 430 and 435, the transmitting serial interface pulses its transmission pin low during the second and third samples of the error correction phase for the i+1th bit since the receiving serial interface has mistakenly pulled its transmit pin low during the preceding acknowledgement phase 450.

Advantageously, the impedance control discussed previously may be utilized during the various phases in each bit transmission to provide bit-by-bit error correction. For example, the transmitting serial interface may be configured to use its low output transmit pin impedance during the first seven samples in each transmission phase 445. In this fashion, the transmitting serial interface may be assured that it has rapidly changed the corresponding receive pin voltage on the receiving serial interface during each transmission phase 445. To keep contention at a minimum, the receiving serial interface may keep its receiving pin input impedance in the high state during each transmission phase 445. At the last sample of each transmission phase 445, the transmitting serial interface "latches" its transmit pin voltage by switching to the high impedance mode. During the subsequent acknowledgment phase 450, the receiving serial interface utilizes its low receive pin impedance so that it may be guaranteed to control the transmit pin voltage in the transmitting device. The transmitting serial interface maintains the high transmit pin impedance that started in the preceding transmission phase 445 during each acknowledgement phase 450 to reduce contention.

Upon the completion of each acknowledgement phase 450, the receiving serial interface switches to its high receive pin impedance, which is maintained until the subsequent acknowledgement phase 450. In each error correction phase 440, the transmitting device may uses its low transmit pin impedance, which is then maintained for the first seven samples in the subsequent transmission phase 445 as discussed earlier.

Note that the transmission phase 445 shown in FIG. 4A may be readily modified to accommodate a pulse-width-modulated bit transmission in which either a relatively wide pulse or a narrower pulse is used to transmit the binary bit states. The acknowledgement and error correction phases may be as discussed with regard to FIG. 4 in such pulse-width-modulated embodiments. Referring back to FIG. 1, it will be appreciated that a conventional UART IP block is readily modified into modified UART interface 116 that practice the various phases discussed with regard to FIG. 4A for each transmitted bit.

Figure 4B:
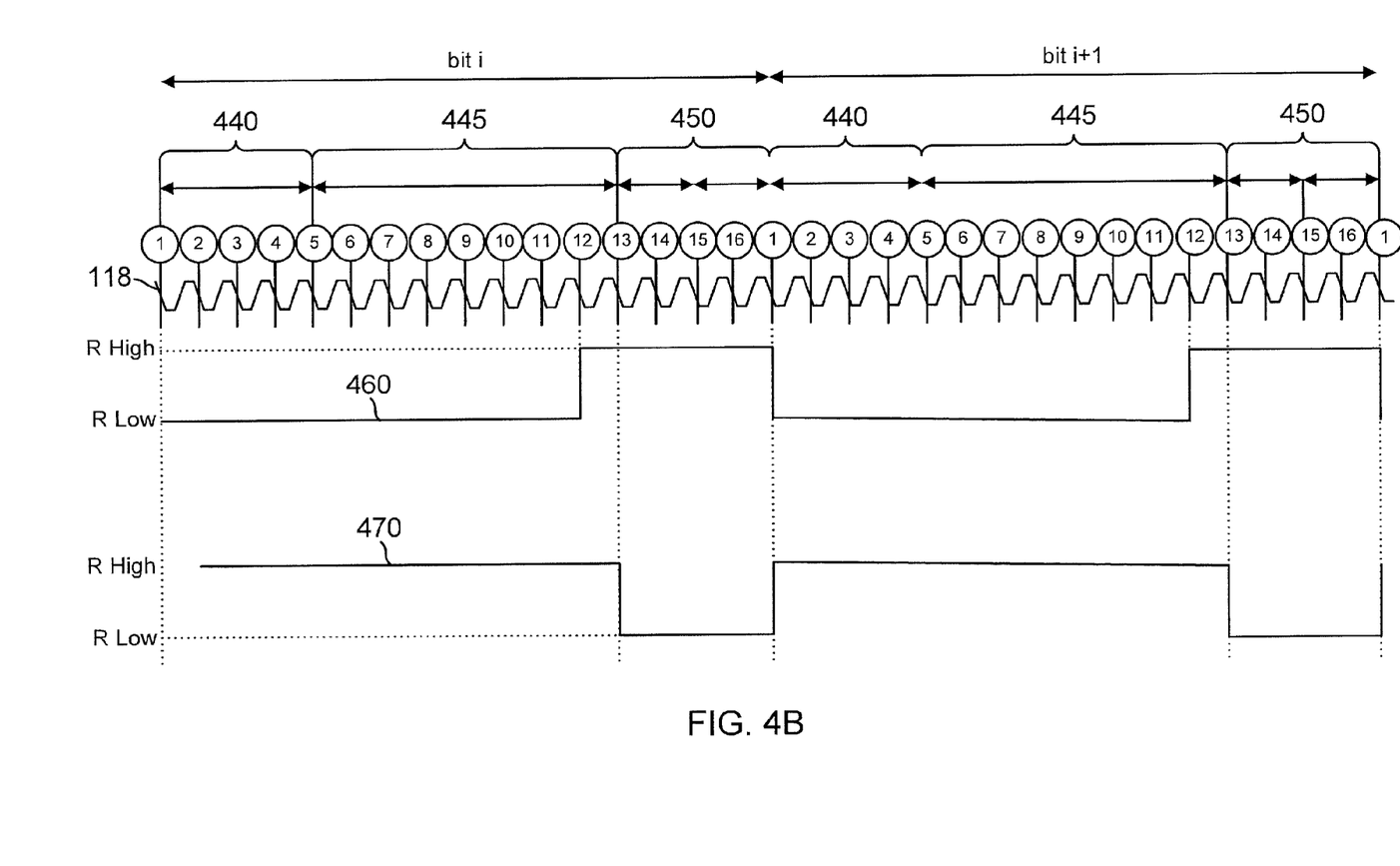
FIG. 4B illustrates the transmitting and receiving impedance states for the consecutive bits of FIG. 4A.

The impedance control for the signaling of FIG. 4A may be better understood with reference to FIG. 4B, which shows a transmitting impedance 460 for the transmitting serial interface as well as a receiving impedance 470 for the receiving serial interface. As shown for current bit i and the subsequent bit (i+1), transmitting impedance 460 is maintained at the low impedance state (R Low) for the first four samples (samples 1 through 4) of oversampling clock signal 118 for each error correction phase 440. Referring again to FIG. 3, switch S2 would thus be closed and switch S1 open in transmitter output driver 315 during each error correction phase 440. To avoid contention, receiving impedance 470 is maintained in the high impedance state (Rhigh) during each error correction phase 440. Switch S3 would thus be closed in receiver output driver 330 (FIG. 3) and switch S4 maintained open during each error correction phase 440. At the same time, switch S5 would select for ground.

In each transmission phase 445, transmitting impedance 460 is maintained at the low value for the first seven samples (samples 6 through 11). Switches S1 and S2 in transmitter output driver 315 are thus maintained as described for error correction phase 440 during these seven samples. At the final eight sample (sample 12), the transmitting impedance 460 switches to the high state and is maintained for the duration of the subsequent acknowledgement phase 450. Switch S2 would thus be opened and switch S1 closed in output driver 315 beginning at sample 12 and continuing through sample 16. Similarly, switches S3, S4, and S5 would be maintained as discussed for error correction phase 440 during the duration of transmission phase 444. In the acknowledgement phase 450, switch S3 opens and switch S4 closes while switch S5 selects for the acknowledgment signal (ACK) in receiver output driver 330.

Not only does the variable output impedance advantageously aid in the establishment of error correction over the two-wire interface, it also inherently protects against back-power conditions following power-on of the devices. In that regard, it may be the case as the devices are powered on that one integrated circuit is the first to drive its transmit pin voltage high while a receiving device is still powered down. This asserted voltage being received at a powered-off device may form forward-biased parasitic diodes at the receiving device that waste current and also lead to latch-up or other glitches as the receiving device is finally powered on. This problem is conventionally denoted as a back-power condition. But the default high output impedance for the transmit serial interface disclosed herein inherently avoids this problem because it takes a certain amount of current to forward bias the parasitic diode in the receiving device. The high output impedance for the transmit serial interface limits the current drawn by the powered-off receiving device such that no back-power condition is created.

In addition, the high output impedance used at power-up is advantageous during the enumeration process. At power-on reset, prior to the initial enumeration, the transmit pin voltage level remains at a binary one value with a high impedance. The device which asserts its transmit pin 111 with a binary one state first gains the "master" status. This means that prior to setting its transmit pin 111 to a binary one value, the device checks the signal status at its receive pin 112. Since the master SOC always powers on first, its role as master is therefore ensured with this simple protocol. This same behavior (first to turn-on becomes master) also resolves any conflict which may arise in a virtual GPIO interface involved in multi-drop configuration.

In the remote corner case condition, due to the de-bounce timing difference (which may occur from one device to another in multi-drop configuration), the first iteration of the early enumeration results in failure. The subsequent attempt starts with the asynchronous local clock on each side trying to take lead as the master. Since the probability of the asynchronous clock's positive-edge on the two sides having zero phase difference is infinitely small, one of the two devices will always become the master.

Figure 5:
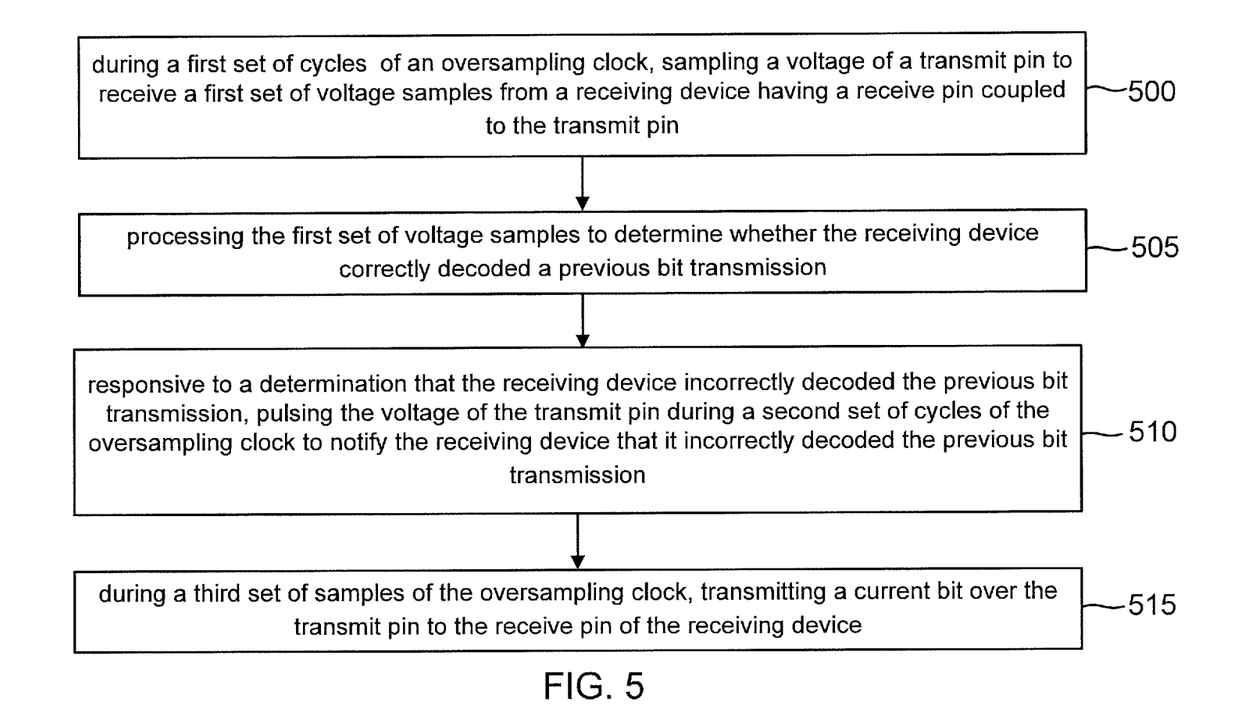
FIG. 5 is a flowchart of a method of operation for a transmitting serial interface implementing for a bit-level error correction scheme in accordance with an aspect of the disclosure.

A method of operation for a transmitter serial interface will now be discussed with regard to the flowchart of FIG. 5. The method includes an act 500 of, during a first set of cycles of an oversampling clock, sampling a voltage of a transmit pin to receive a first set of voltage samples from a receiving device having a receive pin coupled to the transmit pin. The sampling of the transmit pin voltage through samples 12 through 16 in each bit period discussed with regard to FIG. 4B is an example of act 500.

The method also includes an act 505 of processing the first set of voltage samples to determine whether the receiving device correctly decoded a previous bit transmission. Referring to FIG. 1, modified UART interface 116 is configured to practice act 505 to determine the binary value that was acknowledged by the receiving serial interface.

The method also includes an act 510 of responsive to a determination that the receiving device incorrectly decoded the previous bit transmission, pulsing the voltage of the transmit pin during a second set of cycles of the oversampling clock to notify the receiving device that it incorrectly decoded the previous bit transmission. The pulsing of the transmit pin voltage during the error correction phase 440 for the subsequent bit (i+1) in bit combinations 420, 425, 430, and 435 as discussed with regard to FIG. 4A is an example of act 510.

Finally, the method includes an act 515 of, during a third set of samples of the oversampling clock, transmitting a current bit over the transmit pin to the receive pin of the receiving device. The transmission of current bit i as discussed with regard to the transmission phase 445 of FIG. 4A is an example of act 515.

Figure 6:
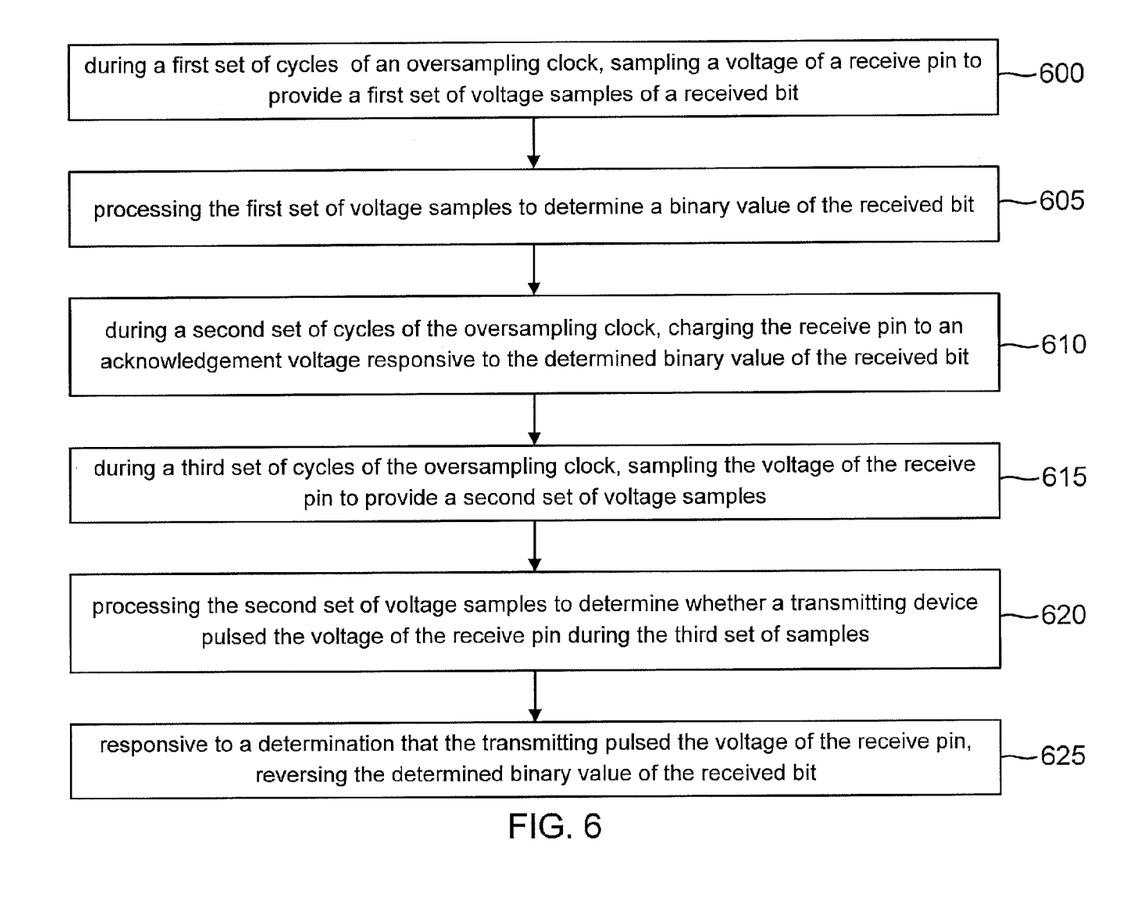
FIG. 6 is a flowchart of a method of operation for a receiving serial interface implementing for a bit-level error correction scheme in accordance with an aspect of the disclosure.

An analogous method of operation for a receiver serial interface will now be discussed with regard to the flowchart of FIG. 6. The method includes an act 600 of, during a first set of cycles of an oversampling clock, sampling a voltage of a receive pin to provide a first set of voltage samples of a received bit. The collection of samples 6 through 12 by the receiving serial interface during each transmission phase 445 of FIG. 4A is an example of act 600.

The method also includes an act 605 of processing the first set of voltage samples to determine a binary value of the received bit. Referring to FIG. 1, modified UART interface 116 is configured to practice act 605 to determine the binary value that was transmitted by the transmitting serial interface.

The method also includes an act 610 of, during a second set of cycles of the oversampling clock, charging the receive pin to an acknowledgment voltage responsive to the determined binary value of the received bit. The transmission of samples 13 through 16 by receiver output driver 330 as discussed in conjunction with FIG. 4B is an example of act 610.

In addition, the method includes an act 615 of, during a third set of cycles of the oversampling clock, sampling the voltage of the receive pin to provide a second set of voltage samples. The method further includes an act 620 of processing the third set of voltage samples to determine whether a transmitting device pulsed the voltage of the receive pin during the third set of samples. Referring again to FIG. 1, modified UART interface 116 is configured to determine whether three or more rising or falling edges was detected from samples 1 through 4 (FIG. 4A) of the receive pin voltage as an example of acts 615 and 620.

Finally, the method includes an act 625 of, responsive to a determination that the transmitting device pulsed the voltage of the receive pin, reversing the determined binary value of the received bit. Referring again to FIG. 1, modified UART interface 116 is configured to reverse the decoded value of the received bit in accordance with act 620.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method, comprising:
   during a first set of cycles of an oversampling clock, sampling a voltage of the transmit pin to receive a first set of voltage samples from a receiving device having a receive pin coupled to the transmit pin;

processing the first set of voltage samples to determine whether the receiving device correctly decoded a previous bit transmission;
responsive to a determination that the receiving device incorrectly decoded the previous bit transmission, pulsing the voltage of the transmit pin during a second set of cycles of the oversampling clock to notify the receiving device that the receiving device incorrectly decoded the previous bit transmission; and
during a third set of samples of the oversampling clock, transmitting a current bit over the transmit pin to the receive pin of the receiving device.

2. The method of claim 1, wherein the oversampling clock is a 16× oversampling clock.

3. The method of claim 1, wherein a transmitter is configured to select between a high impedance and a low impedance for driving the transmit pin, and wherein transmitting the current bit comprises transmitting the current bit using the low impedance for an initial portion of the third set of samples and transmitting the current bit using the high impedance for a final portion of the third set of samples, wherein the high impedance is greater than the low impedance.

4. The method of claim 3, wherein the final portion of the third set of samples comprises a final sample of the third set of samples, and wherein the initial portion of the third set of samples comprises all of the third set of samples except for the final sample.

5. The method of claim 3, wherein the pulsing the voltage of the transmit pin during the second set of samples comprises pulsing the voltage of the transmit pin using the low impedance.

6. The method of claim 1, wherein a transmitter is configured to select between a high impedance and a low impedance for the sampling of the transmit pin voltage, and wherein receiving the first set of voltage samples comprises sampling the transmit pin voltage using the high impedance, wherein the high impedance is greater than the low impedance.

7. The method of claim 1, wherein transmitting the current bit comprises transmitting a virtual GPIO signal in a frame of virtual GPIO signals.

8. A method, comprising:
during a first set of cycles of an oversampling clock, sampling a voltage of a receive pin to provide a first set of voltage samples of a received bit;
processing the first set of voltage samples to determine a binary value of the received bit;
during a second set of cycles of the oversampling clock, charging the receive pin to an acknowledgment voltage responsive to the determined binary value of the received bit;
during a third set of cycles of the oversampling clock, sampling the voltage of the receive pin to provide a second set of voltage samples;
processing the third set of voltage samples to determine whether a transmitting device pulsed the voltage of the receive pin during the third set of samples; and
responsive to a determination that the transmitting device pulsed the voltage of the receive pin, reversing the determined binary value of the received bit.

9. The method of claim 8, wherein the oversampling clock is a 16× oversampling clock.

10. The method of claim 8, wherein a receiver is configured to select between a high impedance and a low impedance for the sampling of the receive pin voltage and for the charging of the receive pin voltage, and wherein sampling the first set of voltage samples comprises sampling the receive pin voltage using the high impedance, wherein the high impedance is greater than the low impedance.

11. The method of claim 10, wherein charging the receive pin to the acknowledgement voltage during the second set of samples comprises charging the receive pin through the low impedance.

12. The method of claim 8, wherein charging the receive pin to the acknowledgement voltage for a determined binary one state of the received bit comprises charging the receive pin to a power supply voltage.

13. The method of claim 12, wherein charging the receive pin to the acknowledgement voltage for a determined binary zero state of the received bit comprises charging the receive pin to a ground voltage.

14. The method of claim 8, wherein processing the third set of voltage samples comprises determining whether the third set of voltage samples represents three or more rising or falling edges.

15. The method of claim 8, wherein sampling the voltage of a receive pin to provide the first set of voltage samples of the received bit comprises sampling a virtual GPIO signal in a frame of virtual GPIO signals.

16. A device, comprising:
a first processor;
a plurality of GPIO pins;
a GPIO interface configured to receive a first set of signals from the first processor and to transmit a portion of the first set of signals as GPIO signals to a remote processor over the plurality of GPIO pins;
a transmit pin;
a modified UART interface;
a finite state machine (FSM) configured to receive a remaining portion of the first set of signals from the GPIO interface and to serially transmit the remaining portion as a transmit set of virtual GPIO signals organized into frames to the remote processor through the modified UART interface over the transmit pin; and
an oversampling clock,
wherein the modified UART interface is configured to transmit each bit, in the frame responsive to cycles of the oversampling clock such that each bit transmission comprises:
an acknowledgement phase during a first set of cycles of the oversampling clock in which the modified UART interface is configured to sample a voltage of the transmit pin to receive a first set of samples from a receiving device having a receive pin coupled to the transmit pin and to process the first set of voltage samples to determine whether the receiving device correctly decoded a previous bit transmission;
an error correction phase during a second set of cycles of the oversampling clock in which the modified UART interface is configure to, responsive to a determination that the receiving device incorrectly decoded the previous bit transmission, pulse the voltage of the transmit pin to notify the receiving device that it incorrectly decoded the previous bit transmission; and
a transmission phase during a third set of samples of the oversampling clock, in which the modified UART interface is configured to transmit the bit over the transmit pin to the receive pin of the receiving device.

17. The device of claim 16, wherein the modified UART interface is further configured such that for each transmitted bit, the second set of samples occurs before the first set of samples and before the third set of samples.

18. The device of claim 16, wherein the modified UART interface includes:
an output driver having a high impedance resistor and a low impedance resistor, wherein the output driver is further configured to select for the low impedance resistor during a first portion of the third set of samples and to drive the transmit pin through the low impedance resistor during a first portion of the third set of samples and to drive the transmit pin through the high impedance resistor during a final portion of the third set of samples.

19. The device of claim 18, wherein the final portion of the third set of samples comprises a final sample and wherein the first portion of the third set of samples comprises the third set of samples except for the final sample.

20. The device of claim 18, wherein the oversampling clock is a 16× oversampling clock and wherein the third set of samples comprises eight samples.

21. The device of claim 17, wherein the output driver is further configured to sample the transmit pin to sample the first set of samples through the high impedance resistor.

22. A device, comprising:
a first processor;
a plurality of GPIO pins;
a GPIO interface configured to receive a first set of signals from the first processor and to transmit a portion of the first set of signals as GPIO signals to a remote processor over the plurality of GPIO pins;
a receive pin;
a modified UART interface;
a finite state machine (FSM) configured to receive a receive set of virtual GPIO signals organized into frames from the remote processor through the modified UART interface over the receive pin; and
an oversampling clock,
wherein the modified UART interface is configured to receive each bit in the frame responsive to cycles of the oversampling clock such that each bit reception comprises:
a transmission phase during a first set of samples of the oversampling clock, in which the modified UART interface is configured to sample the bit through the receive pin;
an acknowledgement phase during a first second of cycles of the oversampling clock in which the modified UART interface is configured to charge a voltage of the receive pin to acknowledge a binary value of the sampled bit during the transmission phase; and
an error correction phase during a third set of cycles of the oversampling clock in which the modified UART interface is configure to determine if a transmitting device pulsed the receive voltage during the third set of cycles to signal that the acknowledge binary value of the sampled bit is in error.

23. The device of claim 22, wherein the oversampling clock is a 16× oversampling clock.

24. The device of claim 22, wherein the modified UART interface includes:
an output driver having a high impedance resistor and a low impedance resistor, wherein the output driver is further configured to select for the high impedance resistor during a first portion of the third set of samples and to sample the receive pin through the high impedance resistor during the first set of samples, and to select for the low impedance resistor and to drive the receive pin through the low impedance resistor the second set of samples, wherein the high impedance resistor has a resistance that is greater than a resistance of the low impedance resistor.

25. The device of claim 24, wherein the resistance of the high impedance resistors is greater than 10 times the resistance of the low impedance resistor.

26. The device of claim 24, wherein the output driver is further configured to sample the receive pin voltage during the third set of samples through the low impedance resistor.

* * * * *